United States Patent

Whelan

[11] 3,844,543
[45] Oct. 29, 1974

[54] HYDRAULIC LEVELER WITH EXHAUST ONLY HEIGHT CONTROL VALVE

[75] Inventor: James E. Whelan, Dayton, Ohio

[73] Assignee: General Motors Corporation, Detroit, Mich.

[22] Filed: Feb. 26, 1973

[21] Appl. No.: 335,475

[52] U.S. Cl. .................................................. 267/64
[51] Int. Cl. ............................................. F16f 5/00
[58] Field of Search ......... 267/64 R, DIG. 1, DIG. 2

[56] References Cited
UNITED STATES PATENTS
2,802,664  8/1957  Jackson .......................... 267/DIG. 2
3,140,098  7/1964  Broadwell ...................... 267/DIG. 1

Primary Examiner—James B. Marbert
Attorney, Agent, or Firm—J. C. Evans

[57] ABSTRACT

In preferred form, a combination shock absorber and leveler unit including a shock absorber having an outer cylinder member which cooperates with a pressure cylinder to define a low pressure exhaust space for return of hydraulic leveling fluid. The unit includes a rod displacement chamber and a gas charged chamber carried on a cap member connected to a hollow piston rod and movable therewith with respect to the outer surface of the shock absorber. Hydraulic fluid is pumped into the unit through the cap member for pressurizing the gas space to increase the pressure level in the unit thereby to produce a resultant uplifting force on the piston rod for leveling. Valve means are located internally of the hollow piston rod to direct oil from the unit through the low pressure exhaust space during an exhaust phase of operation.

5 Claims, 3 Drawing Figures

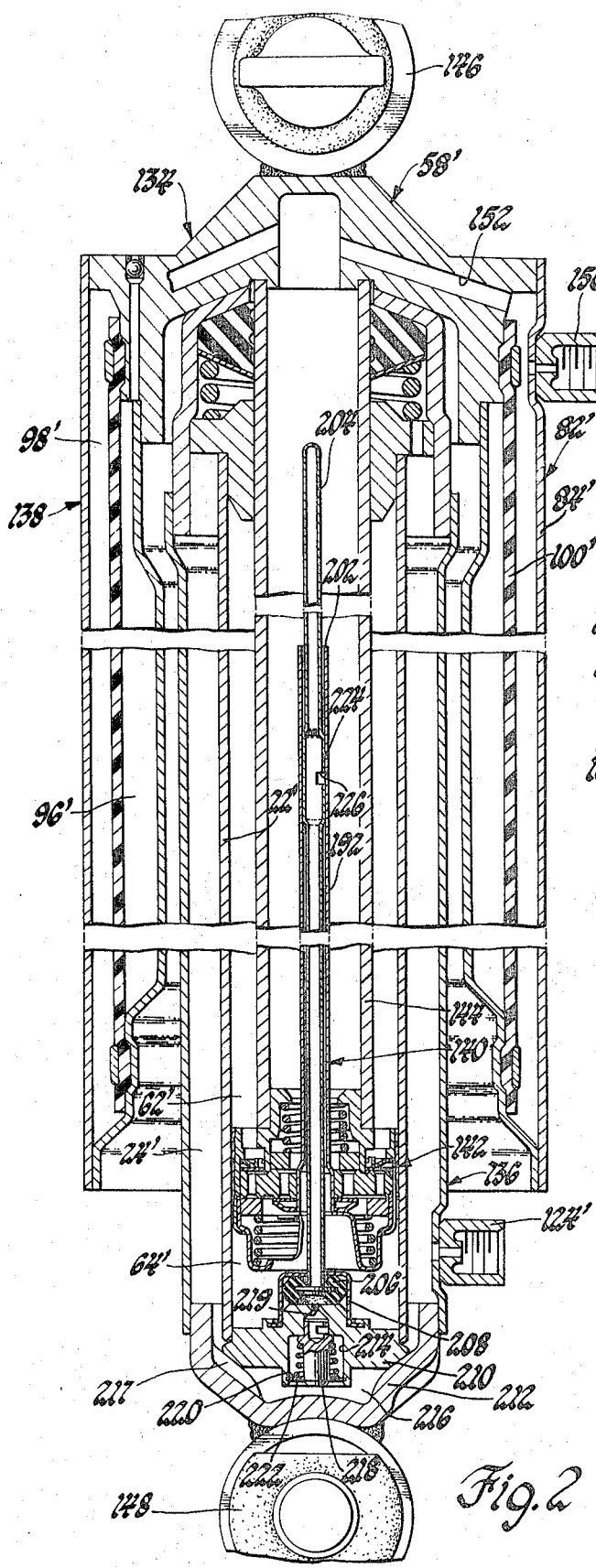
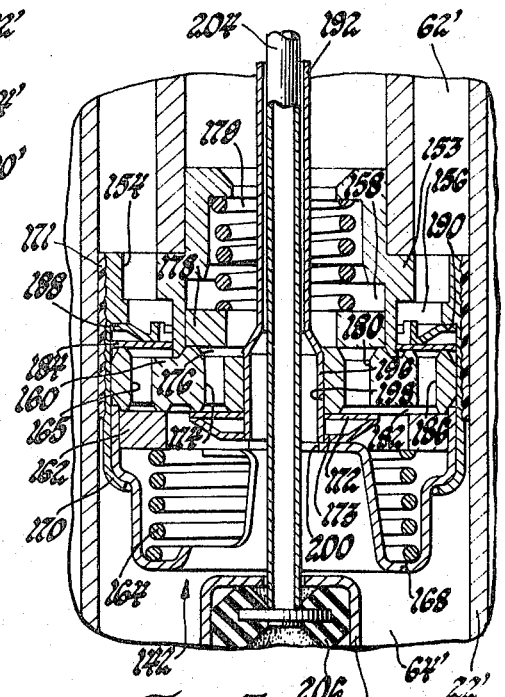
Fig. 2
Fig. 3

HYDRAULIC LEVELER WITH EXHAUST ONLY HEIGHT CONTROL VALVE

This invention relates to combination shock absorber and vehicle leveler units and more particularly of the type utilizing the reaction of compressed gas to pressurize an oil-filled compartment to produce a resultant leveling force on a piston rod component of the shock absorber unit.

Typical double direct-acting hydraulic shock absorbers presently used in vehicle suspension systems in the United States are characterized by the provision of an internally located pressure cylinder which is surrounded by an outer cylinder to define a space between the pressure cylinder and the outer cylinder normally used as a partially filled oil reservoir that accommodates piston rod displacement. More particularly in such arrangements, a valved piston is located interiorly of the pressure cylinder to divide it into a compression and rebound chamber. Suitable valve means are provided to control fluid flow between the rebound and compression chambers as well as the reservoir chamber to produce a pressure differential across the piston to damp relative movement of a piston rod connected to the piston which extends exteriorly of the shock absorber.

The shock absorber piston rod is connected to an end cap member adapted to be connected to a first suspension component. A connection is provided on the base of the shock absorber to another relatively moving suspension component to produce movement of the piston rod into and out of the pressure cylinder. In such arrangements, the piston rod extends through a rod guide member at the upper end of the pressure cylinder and thence through a cavity member which includes a seal that engages the outer periphery of the piston rod to seal against the leakage of hydraulic fluid from the reservoir.

Various proposals have been suggested to modify such conventional shock absorbers for use as a supplemental load carrying support device or leveler unit in a vehicle suspension.

One proposal has been to provide an air spring on the shock absorber which, when pressurized, will produce a supplemental force between the suspension connected ends of the unit.

Other proposals have included the provision of a hydropneumatic system in conjunction with the shock absorber to produce a resultant pressure force on the piston rod of the unit to support additional vehicle load and thereby produce a leveling function.

Existing units using an auxiliary air spring on the shock absorber unit require little or no modification of the shock absorber per se. However, these units require a source of air pressure on the vehicle to be operative. One advantage of leveler units of the hydropneumatic type is that they can utilize existing hydraulic systems on motor vehicles to produce a change of resultant pressure on the piston rod component of a shock absorber to produce the leveling function. Such units, however, require substantial modification to a standard direct-acting hydraulic shock absorber.

Accordingly, an object of the present invention is to provide a combination shock absorber and leveler unit of the hydropneumatic type which uses standard double direct-acting hydraulic shock absorber components to define an oil pressure system and oil exhaust circuit for controlling the unit.

Still another object of the present invention is to modify a standard dust shield component of a double direct-acting hydraulic shock absorber to include a rod displacement compensating volume and means for varying the hydraulic pressure in an oil-filled pressure cylinder to produce an uplifting force on a piston rod component of a shock absorber and wherein a reservoir space normally found on a double direct-acting hydraulic shock absorber is utilized as a low pressure space for exhaust of oil from the unit during an exhaust phase of operation.

Yet another object of the present invention is to utilize existing components of the standard double direct-acting hydraulic shock absorber of the type including a pressure cylinder and an outer reservoir forming a space therebetween by connecting means to an end cap connected to a piston rod of the shock absorber that serve to compensate for piston rod volume changes in the pressure cylinder and which include means for changing the pressure within the pressure cylinder to vary the resultant force on the piston rod for producing an uplifting force thereon and wherein valve means are included within the pressure cylinder responsive to a predetermined height relationship between suspension components connected to the piston rod and to the outer cylinder of the shock absorber to exhaust oil from the pressure cylinder into the space between the pressure cylinder and outer reservoir cylinder of the unit during an exhaust phase of operation.

Another object of the present invention is to simplify the control valves for damping and rod volume compensation in a shock absorber by the provision of a hollow piston rod communicating with a rod volume compensating chamber and connected to a valve plate which carries a first pair of valve means to compensate for rod volume changes in the pressure by flow through the hollow piston rod and a second pair of valves operative to control flow across the piston between rebound and compression chambers for damping movement of the piston rod.

These and other objects of the present invention are attained in one working embodiment which includes a standard double direct-acting hydraulic shock absorber having an interior pressure cylinder filled with hydraulic fluid closed at one end thereof by a base closure member and having a piston rod guide supported at the opposite end thereof. A cup-shaped seal cavity member is inverted over the upper end of the rod guide and serves to support one end of an outer reservoir cylinder having the opposite end thereof connected to the base closure member of the pressure cylinder to define an oil-filled low pressure exhaust space therebetween. A seal is located within the seal cavity member in engagement with the outer periphery of the hollow piston rod which has one end thereof extending outwardly of the seal cavity member and the opposite end thereof connected to a valved piston which is supported by the inside diameter of the pressure cylinder for opposite reciprocation therein. The piston divides the pressure cylinder into an upper and lower compartment and the valve means therein controls fluid flow between the upper and lower compartments to produce a predetermined control of movement of the hollow rod into and out of the pressure cylinder.

A cap member is connected to the exteriorly located end of the hollow piston rod. It includes a conventional dust shield on the outer periphery thereof located in telescoped relationship with the outer surface of the shock absorber. Additionally, the cap member includes an inner cylindrical member which cooperates with the outer dust shield member to define a chamber in which is located a flexible sleeve type diaphragm which divides the chamber into a charged gas space and an oil-filled rod volume compensating chamber. Passageway means are directed through the cap member to communicate an outlet of a hydraulic pressure source with the interior of the rod volume compensating chamber and the interior of the pressure cylinder.

During a leveling phase of operation, oil is directed through the passageway means into the rod volume compensating chamber to compress the gas in the gas chamber to increase the level of pressure acting on the damping fluid in the pressure cylinder. This produces a resultant force on the piston rod causing it to move exteriorly of the pressure cylinder thereby to produce an uplifting force which will supplement the spring support of a conventional vehicle suspension for leveling the vehicle.

Following a predetermined extension of the piston rod valve means located interiorly of the pressure cylinder are operated to communicate the pressure cylinder and the space between the outer reservoir of the shock absorber and the pressure cylinder to cause oil to bleed from the shock absorber into the space. An exhaust fitting is connected to the outer shock absorber reservoir cylinder for returning oil pumped into the leveler unit back to a hydraulic sump during the exhaust phase of operation.

Further objects and advantages of the present invention will be apparent from the following description, reference being had to the accompanying drawings wherein a preferred embodiment of the present invention is clearly shown.

In the drawings:

FIG. 2 is a vertical sectional view of another embodiment of a combination shock absorber and leveler unit; and FIG. 3 is an enlarged fragmentary sectional view showing components of a valved piston and oil exhaust controller in the second embodiment.

Figure 1:
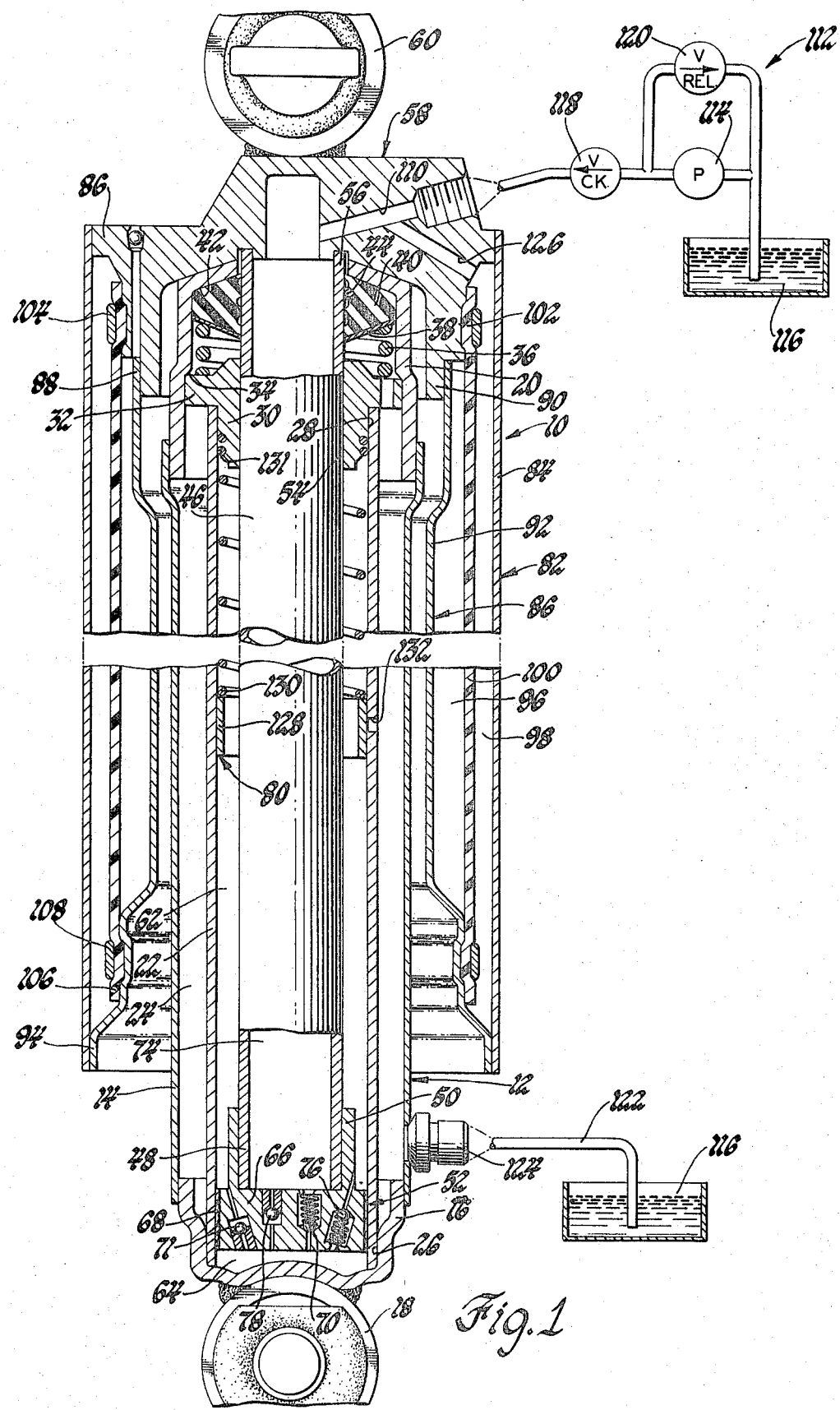
FIG. 1 is a vertical sectional view of a combination shock absorber and leveler unit shown in association with a diagrammatically represented hydraulic supply system.

Referring now to FIG. 1 of the drawings, a combination shock absorber and vehicle leveler unit 10 is illustrated. It includes a shock absorber assembly 12 utilizing many standard components of double direct-acting hydraulic shock absorbers of the type found in vehicle suspension systems in the U.S. at the present time. The assembly 12 more particularly includes an outer tube 14 which is closed at one end thereof by means of a base closure member 16 connected to a ring mount assembly 18 of the type adapted to be connected to a component of the unsprung mass portion of a vehicle suspension system.

The upper end of the outer tube 14 is connected to one end of an inverted cup-shaped seal cavity member 20. A pressure cylinder 22 is located interiorly of and in spaced relationship to the outer tube 14 to form an oil exhaust space 24 therebetween. The pressure cylinder 22 more particularly includes a bottom open end thereof located within a reduced diameter interior surface 26 of the closure member 16 in sealed relationship therewith whereby the closure member 16 serves to close the lower end of the pressure cylinder 22. The opposite end of the pressure cylinder 22 is located in engagement with the outer periphery 28 of a rod guide member 30 which includes an outwardly directed flange 32 thereon seated on the upper end of the pressure cylinder 22 and a shoulder 34 on the cavity member 20.

The flange 32 supports one end of a spring 36 which has the opposite end thereof in engagement with a seal washer 38 in engagement with the underside of an annular seal member 40 supportingly received by an upper inner surface 42 of the cavity member 20. The seal 40 has a plurality of axially spaced lips 44 thereon maintained in engagement with the outer surface of a hollow piston rod 46. Piston rod 46 has an inner end 48 thereon connected to an upstanding flange 50 on a valved piston assembly 52. The piston rod 46 extends through a bore 54 in the rod guide member 30 to be supportingly received thereby thence through the seal cavity member 20 where it is sealed by the lips 44 on the seal member 40. Rod 46 includes an exteriorly located end 56 connected to an outwardly located cap member 58. The cap member 58 is connected to a ring mount assembly 60 adapted to be connected to a component of the sprung mass of the vehicle suspension system.

The aforesaid components constitute the operative components of the shock absorber 12. Hence, in response to ordinary road movement, the ring mount 60 will move with respect to the ring mount assembly 18 to cause the hollow piston rod 46 to move into and out of the oil-filled pressure cylinder 22. The valved piston assembly 52 reciprocating within the cylinder 22 divides it into an upper rebound control chamber 62 and a lower compression chamber 64. Assembly 52 has a piston 66 with a peripheral seal 68 in engagement with cylinder 22 to guide rod movement. During a compression stroke wherein the hollow piston rod 46 moves interiorly of the cylinder 22, oil flows across a compression blow-off valve 70 in piston 52 between chamber 64 and the interior 74 of rod 46 to produce a predetermined damping of movement of the rod 46 interiorly of the pressure cylinder 22. Movement of rod 46 into cylinder 22 is accompanied also by oil flow across a check valve 71 in piston 66 from chamber 64 into chamber 62 and also from chamber 64 across valve 70 into the interior 74 thence to rod volume compensating means to be discussed.

On a rebound movement, the suspension will move the piston rod 46 exteriorly of the pressure cylinder 22. Control is across a rebound blow-off control valve 76 in the piston 66 to communicate chambers 62, 64. A check valve 78 in piston 66 communicates chamber 64 with the interior 74 of rod 46 to permit flow of hydraulic fluid into the chamber 64 to accommodate for reduction of rod volume in cylinder 22 as the rod 46 moves exteriorly thereof during rebound movement.

In accordance with certain principles of the present invention, during maximum compression movement of the piston rod 46 into the pressure cylinder 22, a valve assembly 80 blocks communication between the interior of the pressure cylinder 22 and the exhaust space 24. In conventional shock absorbers, this space is partially filled with oil and a compressible gas and constitutes a reservoir space for compensating for changes in rod volume within the pressure cylinder 22.

In accordance with certain principles of the present invention, this rod displacement function is accomplished by means of a combination rod volume displacement and oil charge assembly 82. The assembly 82 is formed in part by a dust shield tube 84 having the upper end thereof connected to the outer periphery 86 of the cap member 58 in sealing relationship therewith. The dust shield 84, as in the case of conventional shock absorbers, protects the outer diameter of the piston rod 46 against dirt, moisture and the like. It depends from the cap member 58 in telescoped relationship with the outer surface of the shock absorber unit 12. In the illustrated arrangement, assembly 82 further includes an inner cylinder member 86 located between the outer surface of the shock absorber and the inner surface of the dust shield tube 84. The upper end 88 of the inner cylinder 86 is connected to a depending reduced diameter portion 90 of the cap member 58 to move concurrently therewith along with the dust shield tube 84. Its midpoint is bent radially inwardly at 92 and its lower end 94 is bent radially outwardly and connected to the lower end of the dust tube 82 in sealing relationship therewith whereby the dust tube 84, cap member 58 and inner cylinder 92 form a compartment which is divided into a charged gas chamber 96 and an oil-filled outer rod displacement and charge chamber 98 by means of a flexible sleeve diaphragm 100 having an upper end 102 thereon sealed against the outer periphery of the cap member 58 by means of a clamp ring 104. The opposite end 106 of the flexible diaphragm 100 is sealed against the inner surface of the inner cylinder 92 by means of a clamp ring 108. By virtue of this arrangement, the gas space or chamber 96 is sealed to maintain a pre-charged gas pressure therein. Oil flow into and out of the oil-filled chamber 98 will cause the flexible diaphragm 100 to move toward and away from the radially inwardly bent segment 92 of the inner cylinder 86 to vary the pressurization of the gas charge in the chamber 96 for purposes to be discussed.

In the illustrated arrangement, the assembly 82 has the oil-filled chamber 98 therein in direct communication with the interior 74 of the piston rod 46. More particularly, the end cap 58 includes an inlet passage 110 which intersects the interior 74 and is adapted to be connected to a hydraulic supply system 112 such as the power steering system of a vehicle. It includes a continuously operated pump 114 which draws oil from a sump 116 and discharges across a check valve 118 for supply through the inlet passage 110. A pressure relief valve 120 will bypass the pump 114 under conditions wherein an excessive pressure build-up is present within the shock absorber and leveler unit 10. The hydraulic system further includes an exhaust conduit 122 adapted to be connected to an exhaust fitting 124 on the lower end of the outer cylinder 14 of the shock absorber 12. It is provided to return hydraulic fluid from the leveler unit to the sump 116 during an exhaust phase of operation.

During normal road movements of the piston rod 46 into and out of the pressure cylinder 22, oil is displaced into and out of the cylinder by an amount equivalent to rod volume displacement. It flows through the interior 74 of the rod 46 through the passage 110 thence through an inclined passage 126 in the cap 58 which communicates passage 110 with the oil-filled chamber 98. As the piston rod 46 is moved exteriorly of the pressure cylinder 22 during normal road movements, makeup oil is drawn from the chamber 98 through the inclined passage 126 and inlet passageway 110 into the piston rod 46 thence to the pressure cylinder 22 and across check valve 78 for compensating for loss of rod volume therein. On movement of rod 46 into cylinder 22 rod volume fluid is displaced from cylinder 22 through rod 46, passageways 110, 126 into chamber 98 with compensating flow from chamber 64 being across check valve 71.

In accordance with certain other principles of the present invention, simplified height responsive valve assembly 80 is included within the shock absorber 12 for controlling flow of fluid between the inlet passage 110 and the exhaust conduit 122 to maintain a predetermined height relationship between the sprung and unsprung mass of a vehicle.

More particularly, valve assembly 80 includes a sleeve valve member 128 slidably supported on the inside surface of the pressure cylinder 22. It is connected to one end of a spring 130 which has the opposite end thereof connected to the rod guide member 30 at 131. In extreme compression positions of rod 46, the sleeve valve member 128 is biased downwardly by the spring 130 so as to be located in overlying relationship with a bleed port 132 in cylinder 22 which communicates the interior of the pressure cylinder 22 with the low pressure or exhaust space 24.

Ordinary road movements of the piston rod 46 into and out of the pressure cylinder 22 will produce damping control of the type set forth above and rod displacement will be compensated for by oil flow into and out of the chamber 98. Under these conditions, piston seal 68 moves above and below port 132 to bleed oil from the pressure cylinder 22. Pump 148 operates continually to make-up this loss to maintain leveled conditions.

Another feature of the present invention is that the rod displacement compensating chamber 98 along with the gas space 96 serves to produce a variable uplifting force by the leveler unit 10 in response to changes in the loading of the vehicle. Thus, when load is placed on a vehicle so as to compress the primary springs thereof, the ring mount assembly 60 will be moved closer to the ring mount assembly 18. Under these conditions, the sleeve valve 128 is located in closed overlying relationship with the bleed port 132. When the vehicle is operated, oil will be directed from the pump 114 across the one-way check valve 118 into the inlet passageway 110. The additional oil will be directed into chamber 98 so as to cause the diaphragm 100 to move closer to the inner cylinder 86. This compresses gas in the chamber 96 and will produce an increased pressure within the oil-filled pressure cylinder 22. The increased pressure will produce a resultant force on the piston rod 46 that will produce an uplifting force to cause the upper ring mount assembly 60 to move the sprung components of the suspension upwardly to compensate for the additional load.

Following leveling, the unit will return to a normal damping mode of operation wherein road movements will move the piston rod 46 into and out of the pressure cylinder 22 and be damped by the valved piston assembly 52 until further changes of load occur on the sprung components of the vehicle suspension.

An exhaust phase of operation is initiated when load is removed from the vehicle. Under these conditions, the primary suspension springs, once the load is removed, will move the ring mount assembly 60 away from the ring mount assembly 18 thereby to cause the piston rod 46 to move exteriorly of the pressure cylinder 22. This will occur until a point is reached where the piston 66 will move against the sleeve valve member 128 and shift it upwardly within the pressure cylinder 22 against the force of the valve spring 130. The valve sleeve 128 along with seal 68 will be moved out of overlying relationship with the bleed port 132 thus communicating the interior of the pressure cylinder 22 with the return space 24. Accordingly, oil will bleed from the oil-filled reservoir 98 and the oil-filled pressure cylinder 22 through the space 24 thence through the outlet fitting 124 and the exhaust conduit 122 back to the sump 116. As this occurs, oil volume in the chamber 98 is reduced thereby causing the diaphragm 100 to move from the inner cylinder 86 to reduce the pressure acting on the oil in the system. The reduction in pressure will reduce the uplifting force causing the sprung mass to move back to a desired height relationship with the unsprung mass at which point, the piston 52 is moved from the valve sleeve 128 whereby it will be returned by the spring 130 into an overlying relationship with the bleed port 132 thus terminating the exhaust phase of operation.

Referring now to the embodiment of FIGS. 2 and 3, a combination shock absorber and leveler unit 134 is illustrated. It includes a shock absorber unit 136 having components of the type described with reference to the embodiment of FIG. 1. Additionally, the unit includes a rod volume displacement and gas charge assembly 138 like the assembly 82 in the first embodiment.

The unit includes a modified height responsive valve assembly 140 and a modified valve piston assembly 142 connected to a hollow piston rod 144 corresponding to the piston rod 46 in the first embodiment. In this arrangement, the unit includes an upper ring mount assembly 146 and a lower ring mount assembly 148 adapted to be connected between the sprung and unsprung mass of a vehicle and operative to cause movement of the hollow piston rod 144 into and out of the pressure cylinder of the shock absorber 136. In this embodiment, components like those found in the first embodiment otherwise are identified by the same reference numerals primed.

One modification to this embodiment is the connection between a hydraulic system and the oil-filled chambers therein. In this arrangement, an inlet fitting 150 is connected to the dust shield tube 82' and an inclined passage 152 in the end cap 58 serves to communicate the interior of the hollow piston rod 144 with the operative components of the assembly 138.

The valve piston assembly 142 includes a piston 153 having a plurality of circumferentially spaced passages 154 therethrough which communicate with a flow opening 156 radially outwardly of a depending flange on piston 153 which forms an internal passage 158. An orifice plate 160 underlies piston 153. A rebound valve 162 is spring biased upwardly thereagainst by coil spring 164 against plate 160 to seal passageways 165 therethrough between chambers 62', 64'. The rebound spring 164 is supportingly received by a spring retainer member 168 that is secured to the member 153 by means of a depending flange 170 thereon bent over into secured engagement with the retainer 168. Piston 153 has a peripheral seal 171 thereon in sealing engagement with cylinder 22'. A check valve member 172 held in sealed relationship with the orifice plate 160 by spring 173 closes a relief passage 174 therethrough and opens to allow fluid flow across the piston assembly 142 in response to rebound movements during which oil is directed from the volume compensating chamber 98' to cylinder 22' through passage 152, rod 144, passage 158 and an arcuate groove 176 in the upper face of plate 160 which leads to passageway 174 thence to chamber 64'.

The valve assembly 142 further includes a compression valve 178 supported on the opposite side of the orifice plate 160 from the rebound valve 162 and held closed by spring 179. It blocks flow through a passage 180 in plate 160 that communicate the passage 158 with the interior of the spring retainer 168 via an arcuate groove 182 in the bottom of plate 160. The valve 178 operates to control flow from the compression chamber 64' to chamber 98' via interior of rod 144 during movement of the piston rod 144 into the shock absorber. Rod volume into chamber 62' during compression is under the control of a check valve formed by a disc 184 held in sealing engagement with the orifice plate 160 to seal a plurality of passages 186 therethrough. It is held in place by a valve spring 188 located against shoulder 190 on piston 153. Liquid displaced by the volume of rod 144 on its movement into cylinder 22' is from chamber 64' through groove 182, passageway 186, across valve 184 through opening 156 into chamber 62' and through groove 182, passageway 180 and across valve 178 into the hollow rod 144 thence back to chamber 98'.

In this embodiment of the invention, the height responsive control valve 140 is associated with the valve assembly 142. The valve assembly 140 more particularly includes a hollow sleeve 192 with an outwardly flared base portion 196 supportingly received in a bore 198 through the center of the orifice plate 160. The sleeve is opened at the base thereof to communicate through an opening 200 in the valve retainer 168 into the compression chamber 64' and includes an upper opened end 202 in communication with the interior of the piston rod 144. An upstanding tube 204 is directed through the sleeve 192 and closed at its upper end. It is connected at the lower end thereof to an annular seal member 206 supportingly received by an inverted cup-shaped retainer member 208 that is secured to the upper end of an exhaust valve plate 210 supportingly received by an end closure member 212 corresponding to the end closure member 16 of the first embodiment. The valve plate has a central bore 214 therein in communication with a space 216 therebelow. The space 216 is in direct communication with the space 24' of the shock absorber 136 through passages 217. The bore 214 is communicated across an orifice 219 with a lower open end of the tube 204. Communication between the lower open end of the tube 204 and the space 216 is under the control of a valve 218 located within the bore 214 and maintained in a closed sealed relationship within the plate 210 by means of a spring 220 held in place by means of a retainer 222 on plate 210.

The tube 204 includes an outwardly bulged segment 224 thereon below its upper closed end located in sliding, sealed relationship with the inner surface of the sleeve 192. It includes a bleed port 226 therein which is normally closed by the inner surface of the sleeve 192.

In this embodiment of the invention, normal road movements of the piston rod 144 and valve damping of its movement correspond to those previously described with reference to the embodiment of FIG 1.

During a leveling phase of operation, the oil flow from the hydraulic supply will be directed into the assembly 138 through the inlet fitting 150 into charge chamber 98' to compress gas in chamber 96'. It will thus pressurize the oil-filled pressure cylinder 144 through the inclined passageway 152 in the cap 58' and thereby produce a resultant uplifting force on the piston rod 144 that will serve to raise the sprung mass of the vehicle back to a predetermined desired height relationship. During this phase of operation, the bleed port 226 in the closed tube 204 will remain closed.

During an exhaust phase of operation, when load is removed from the vehicle, resultant outward movement of the piston rod 144 will cause the piston assembly 142 and the sleeve 192 to more upwardly with respect to the tube 204 which is secured against movement by the retainer 208 to the exhaust valve plate 210. Eventually, the outwardly bulged segment 224 thereon including the bleed port 226 therein will be located in alignment with the outwardly flared end 196 of the sleeve 192. At this point, pressurized fluid will exhaust from the leveler unit 134 from the assembly 138 through the bleed port 226 to flow from the open end of the tube 204 across the orifice 216 thence across the valve 218, the space 216 and the space 24' to the outlet fitting 124'. This bleed of pressurized oil will occur until the pressure in the gas chamber 96' of the assembly 138 is reduced to a level at which the uplifting force on the piston rod 144 will lower the sprung mass of the vehicle to the desired height relationship. At this point, the ring mounts assemblies 146, 148 will be returned to a desired relationship therebetween and will cause the sleeve 192 to move downwardly on the upstanding tube 204 whereby the inner surface thereof will seal against the segment 224 to close the bleed port 226 thus terminating the exhaust phase of operation.

In this embodiment as was the case in the first embodiment, a standard shock absorber includes an inner cylinder and diaphragm that cooperate with a standard dust shield component to define a rod volume compensation for a hydraulic shock absorber. It includes the provision of a modified piston valve assembly with dual damping or blow-off valves 162, 168 and dual rod volume compensating check valves 172, 184 mounted on a common valve plate 160. The illustrated exhaust valve plate 210 and valving components therein are components heretofore used as base valve components in a standard hydraulic shock absorber. Their function in this embodiment is to provide an exhaust path for pressurized oil during the unloading phase of operation. Valve 218 in particular serves as a minimum pressure retention valve for the purpose of preventing collapse of diaphragm 100' against its surrounding dust shield tube 84'.

While the embodiments of the present invention, as herein disclosed, constitute a preferred form, it is to be understood that other forms might be adopted.

What is claimed is as follows:

1. A combination hydraulic shock absorber and leveler unit comprising: a pressure cylinder, piston means located within said cylinder for opposite reciprocation therein, a hollow piston rod connected to said piston having one end thereof extending outwardly of said oil-filled pressure cylinder, means for sealing the outwardly extending end of said piston rod to prevent leakage of fluid from said pressure cylinder, a cap member connected to the outwardly extending end of said piston rod movable therewith, means carried by said movable cap member including an inner and an outer cylinder joined to form a sealed space therebetween, bladder means located within said space for separating said space into a radially inwardly located charged gas chamber and a radially outwardly located rod displacement chamber, first passage means for receiving fluid pumped from an external hydraulic source and for directing pumped fluid into said radially outwardly located rod displacement chamber to vary the pressure in said gas chamber, second passage means in said end cap member for directing pressurized fluid from said first passage means into said hollow piston rod thence to said pressure cylinder to produce an increase force on said piston rod to cause it to move exteriorly of said pressure cylinder, means including the interior of said hollow rod and said first and second passage means serving to communicate said rod displacement chamber with said pressure cylinder to accommodate for changes of rod displacement within said pressure cylinder due to rod movements of said piston rod into and out of said pressure cylinder, valve means in said piston means for producing damping of piston rod movement into and out of said pressure cylinder, means forming a low pressure chamber having an outlet adapted to be connected to an external hydraulic sump, and means responsive to a predetermined movement of said piston rod with respect to said pressure cylinder for communicating said second passage means with said outlet for directly bypassing fluid pumped to said first passage means back to a hydraulic sump to control the outward extension of said piston rod with respect to said pressure cylinder for maintaining a predetermined height relationship in a vehicle leveling system.

2. A combination shock absorber and leveler unit comprising: a pressure cylinder having an end closure on one end thereof, rod guide means in the opposite end of said pressure cylinder, a piston member supported within said pressure cylinder for opposite reciprocation therein dividing said pressure cylinder into an upper and lower compartment, a first pair of valves in said piston communicating said upper and lower compartments for regulating fluid flow therethrough to damp relative reciprocating movement of said piston with respect to said pressure cylinder, a hollow piston rod having one end thereof connected to said piston and the opposite end thereof extending through said rod guide means in supported relationship therewith to a point exteriorly of said pressure cylinder, a second pair of valves in said piston to accommodate rod volume changes in said pressure cylinder, one of said second pair of valves returning flow from said hollow rod to said lower compartment on rebound movement of said rod, the other of said second pair of valves communicating said upper and lower compartments on compression movement of said rod, seal means in engagement with the outer periphery of said piston rod for sealing the outer periphery of it to prevent the escape of fluid from said pressure cylinder, a cap member connectd to the exteriorly located end of said piston rod member, a dust shield having one end thereof connected in sealed relationship with said cap member depending therefrom in spaced telescoping relationship with said pressure cylinder, an inner cylinder having one end connected to said cap member located between said dust shield and said pressure cylinder, said inner cylinder having opposite ends joined to said dust shield to define a compartment movable with said cap member, a diaphragm located within said compartment separating it into a radially inwardly located gas chamber and an oil-filled, radially outwardly located rod displacement chamber, passage means for directing oil into said pressure cylinder and said rod displacement chamber to compress gas in said gas chamber and to produce a resultant force on said piston rod to cause it to move exteriorly of said pressure chamber, said passage means serving to direct oil from said second pair of valves and said pressure cylinder into and out of said rod displacement chamber in response to ordinary road movement of said piston rod into and out of said pressure cylinder, means forming an exhaust space on the exterior of said pressure cylinder, exhaust valve means responsive to a predetermined extension of said piston rod outwardly of said pressure cylinder to communicate said pressure cylinder with said exhaust space, and outlet means from said exhaust space for directing oil therefrom to an external sump during an exhaust phase of operation.

3. A combination shock absorber and vehicle leveler unit comprising: a pressure cylinder having a bottom end closure, a rod guide member in the opposite end of said pressure cylinder means including a seal cavity member on said rod guide member, valved piston means supported within said pressure cylinder for opposite reciprocation therein, means on said valved piston means for separating said cylinder into first and second chambers, a hollow piston rod member having one end thereof connected to said valved piston means and the opposite end thereof extending outwardly through said rod guide member and said seal cavity member, seal means within said cavity member engaging said rod to seal the outer periphery thereof to close the upper end of said pressure cylinder, a low pressure tube arranged concentrically of and radially outwardly of said pressure cylinder having the opposite ends thereof sealingly connected to said seal cavity member and said end closure respectively, valve means in said valved piston means operative to produce damping of movement of said piston rod into and out of said pressure cylinder, a cap member connected to said outer end of said piston rod and movable therewith, an outer cylinder on said cap member depending therefrom in spaced telescoping relationship with said low pressure tube, an inner cylindrical member connected to said cap member having one end thereof sealed to said cap member and the opposite end thereof sealed to said outer cylinder to form a space therebetween, means including a flexible sleeve bladder to separate said space into a gas chamber and an oil-filled rod displacement chamber, first passage means in said end cap communicating with said hollow rod and adapted to be connected to an external fluid source for pumping liquid into said hollow rod, second passage means in said end cap communicated with said first passage means and with said rod displacement chamber for directing oil pumped from said first passage means into said rod displacement chamber to compress gas in said gas chamber thereby to increase the internal pressure within said hollow rod and said pressure cylinder to produce an increased outward force on said hollow piston rod, said first and second passage means serving to direct rod displaced oil into and out of said rod displacement chamber in response to road travel movements of said rod to accommodate for changes of rod displacement within said pressure cylinder, and means located interiorly of said pressure cylinder responsive to a predetermined movement of said hollow rod exteriorly of said pressure cylinder to communicate said first passage means with said oil-filled low pressure chamber, and an outlet from said low pressure chamber adapted to be connected to an external hydraulic sump.

4. A combination shock absorber and leveler unit comprising: a pressure cylinder having an end closure member on one end thereof, rod guide means in the opposite end of said pressure cylinder, a piston supported within said pressure cylinder for opposite reciprocation therein dividing said pressure cylinder into an upper and lower compartment, valve means in said piston communicating said upper and lower compartments for regulating fluid flow therethrough for damping relatively reciprocating movement of said piston with respect to said pressure cylinder, a piston rod having one end thereof connected to said piston and the opposite end thereof extending through said rod guide means in supported relationship therewith hence exteriorly of said pressure cylinder, seal means in engagement with the outer periphery of said piston rod for sealing the outer periphery thereof to prevent the escape of fluid from said pressure cylinder, a cap member connected to the exteriorly located end of said piston rod member, a dust shield having one end thereof connected in sealed relationship with said cap member depending therefrom in spaced telescoping relationship with said pressure cylinder, an inner cylinder carried by said cap member located between said dust shield and said pressure cylinder to define a compartment movable with said cap member, a diaphragm located within said space separating it into a gas chamber and an oil-filled rod displacement chamber, passage means for directing oil from an external source into said pressure cylinder and said rod displacement chamber to compress gas in said gas chamber and to produce a resultant force on said piston rod to cause it to move exteriorly of said pressure chamber, said passage means serving to direct oil from said pressure cylinder into and out of said rod displacement chamber in response to ordinary road movement of said piston rod into and out of said pressure cylinder, means forming a low pressure chamber having an outlet adapted to be connected to an external hydraulic sump, exhaust valve means including a bleed port located intermediate the ends of said pressure cylinder, a valve sleeve slidably supported inside of said pressure cylinder and movable with respect to said bleed port for opening and closing said bleed port, a spring located within said pressure cylinder having one end thereof connected to said rod guide means and the opposite end thereof connected to said valve sleeve for normally positioning it in overlying relationship with said port during normal shock absorber operation, said piston being moved upon a predetermined movement of said piston rod outwardly of said pressure cylinder into engagement with said sleeve to move it out of overlying relationship with said bleed port causing discharge of oil pumped into said pressure cylinder into said low pressure chamber thence through said outlet port for return to a hydraulic sump.

5. A combination shock absorber and leveler unit comprising: a pressure cylinder having an end closure member on one end thereof, a rod guide means in the opposite end of said pressure cylinder, a piston supported within said pressure cylinder for opposite reciprocation therein dividing said pressure cylinder into an upper and lower compartment, valve means in said piston communicating said upper and lower compartments for regulating fluid flow therethrough and for damping relatively reciprocating movement of said piston with respect to said pressure cylinder, a hollow piston rod having one end thereof connected to said piston and the opposite end thereof extending through said rod guide means in supported relationship therewith hence exteriorly of said pressure cylinder, seal means in engagement with the outer periphery of said piston rod for sealing the outer periphery thereof to prevent the escape of fluid from said pressure cylinder, a cap member connected to the exteriorly located end of said piston rod member, a dust shield having one end thereof connected in sealed relationship with said cap member depending therefrom in spaced telescoping relationship with said pressure cylinder, an inner cylinder carried by said cap member located between said dust shield and said pressure cylinder to define a compartment movable with said cap member, a diaphragm located within said space separating it into a gas chamber and an oil-filled rod displacement chamber, passage means for directing oil from an external source into said pressure cylinder and said rod displacement chamber to compress gas in said gas chamber and to produce a resultant force on said piston rod to cause it to move exteriorly of said pressure chamber, said passage means serving to direct oil from said pressure cylinder into and out of said rod displacement chamber in response to ordinary road movement of said piston rod into and out of said pressure cylinder, means forming a low pressure chamber having an outlet adapted to be connected to an external hydraulic sump, exhaust valve means including a base valve having a movable valving element maintained normally closed interposed between said low pressure chamber and said pressure cylinder, an upstanding tube supported by said base valve member directed coaxially within said hollow piston rod, a sleeve telescoped over said tube, said sleeve having one end thereof connected to said piston in spaced relationship with said tube to form an enlarged clearance therebetween at said piston, and an open opposite end thereof in communication with the interior of said hollow piston, said tube including an enlarged diameter portion thereon having a bleed port therein, said enlarged portion engaging the inner diameter of said sleeve for normally closing communication between the interior of said hollow piston rod and said bleed port, said sleeve being movable upon a predetermined movement of said piston rod to locate said tube in an open communication with said interior of said piston rod through the enlarged clearance between said sleeve and said tube thereby causing liquid pumped to said piston rod to flow through the open end of said sleeve thence through said bleed port and said tube across said movable valving element into said low pressure chamber for exhaust through said outlet.

* * * * *